US012794828B1

(12) United States Patent
Raziel et al.

(10) Patent No.: US 12,794,828 B1
(45) Date of Patent: Nov. 10, 2026

(54) CONTEXT LABEL GENERATION FOR DATA FINDINGS IN DATA SECURITY POSTURE MANAGEMENT APPLICATIONS

(71) Applicant: Wiz, Inc., New York, NY (US)

(72) Inventors: Alma Raziel, Tel Aviv-Jaffa (IL); Elad Gabay, Tel Aviv (IL); Liron Levin, Kfar Saba (IL); Shira Netta, Tel Aviv (IL); George Pisha, Giv'atayim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/562,298

(22) Filed: Mar. 10, 2026

(51) Int. Cl.

| | |
|---|---|
| ***H04L 9/40*** | (2022.01) |
| ***H04L 47/70*** | (2022.01) |
| *G06F 16/28* | (2019.01) |
| *G06F 21/62* | (2013.01) |

(52) U.S. Cl.
CPC .......... *H04L 47/70* (2013.01); *H04L 63/1408* (2013.01)

(58) Field of Classification Search
CPC ....... H04L 47/70; H04L 63/1408; H04L 9/40; G06F 16/28; G06F 21/62
See application file for complete search history.

(56) References Cited

U.S. PATENT DOCUMENTS

| | | | | |
|---|---|---|---|---|
| 10,382,459 | B2 | 8/2019 | Harris et al. | |
| 11,483,326 | B2 | 10/2022 | Meir et al. | |
| 2024/0303368 | A1* | 9/2024 | Karpovsky | G06F 21/56 |
| 2024/0320242 | A1* | 9/2024 | Raghavan | G06F 16/285 |

FOREIGN PATENT DOCUMENTS

| | | | |
|---|---|---|---|
| GB | 2563340 | A | 12/2018 |

* cited by examiner

*Primary Examiner* — Jude Jean Gilles
(74) *Attorney, Agent, or Firm* — M&B IP Analysts, LLC

(57) ABSTRACT

A system and method for generating and utilizing context labels for allocating cybersecurity monitoring resources in a cloud computing environment are presented. The method includes detecting data objects in data sources of the cloud computing environment; generating a data finding based on data detected associated with at least one data object; obtaining metadata associated with the at least one data object that provide object properties without accessing payload content and obtaining samples of data; generating a sensitive-data classification for the generated data finding by applying pattern recognition to at least a first sample; generating a context for the generated data finding based on at least one of a second sample and the obtained metadata; generating context labels based on the generated context; and initiating a cybersecurity monitoring action in the cloud computing environment based on the generated data finding and the generated context labels.

19 Claims, 6 Drawing Sheets

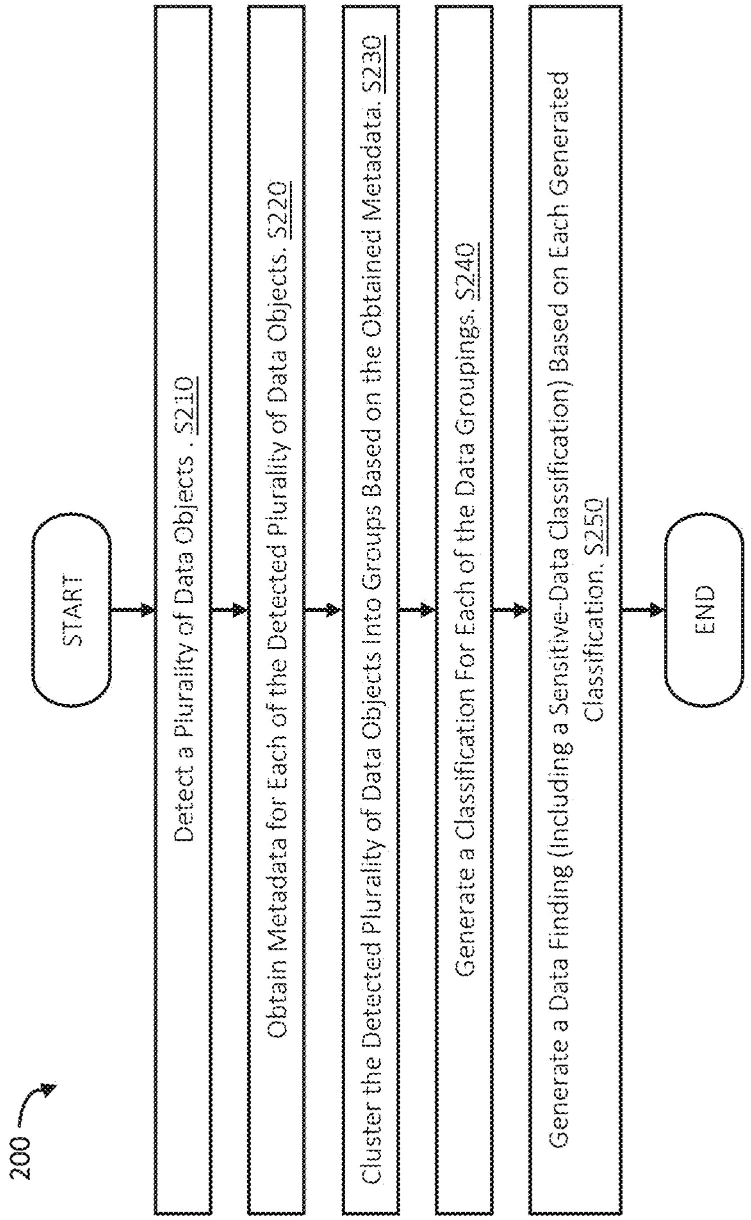
200
START
Detect a Plurality of Data Objects . S210
Obtain Metadata for Each of the Detected Plurality of Data Objects. S220
Cluster the Detected Plurality of Data Objects Into Groups Based on the Obtained Metadata. S230
Generate a Classification For Each of the Data Groupings. S240
Generate a Data Finding (Including a Sensitive-Data Classification) Based on Each Generated Classification. S250
END

WZIO P3307

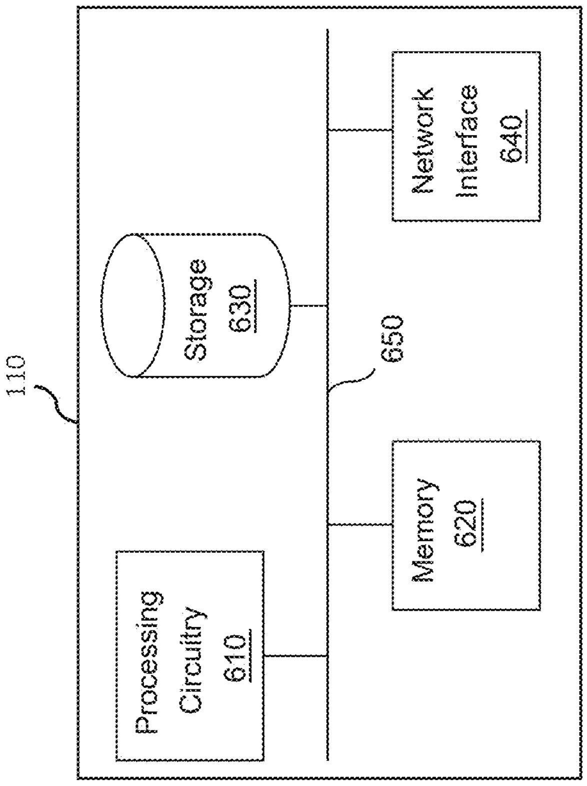
110
Processing Circuitry 610
Memory 620
Storage 630
650
Network Interface 640

CONTEXT LABEL GENERATION FOR DATA FINDINGS IN DATA SECURITY POSTURE MANAGEMENT APPLICATIONS

TECHNICAL FIELD

This disclosure relates, generally, to the field of computing, particularly, to computer security and cloud computing, and more particularly, to data discovery and classification in data security posture management (DSPM) environments, including generating context labels for data findings and initiating cybersecurity monitoring actions in cloud computing environments based on the context labels.

BACKGROUND

Data security posture management (DSPM) systems are increasingly used to discover, classify, and govern data stored across cloud computing environments. Such environments commonly include heterogeneous data sources, such as object storage buckets, databases, backup repositories, log stores, and other managed services distributed across multiple accounts, regions, and cloud service providers. Effective DSPM typically depends on identifying data objects of interest and generating actionable findings to support risk management and cybersecurity monitoring.

Many existing data discovery and classification approaches rely primarily on the inspection of payload content. For example, conventional techniques frequently use pattern matching and content scanning to identify predefined data formats, such as email addresses, payment card numbers, national identifiers, or other structured data patterns. While content-based approaches can be effective for detecting certain known patterns, the resulting classifications often provide limited contextual information needed to assess sensitivity, regulatory exposure, or risk level, and may be insufficient to guide allocation of constrained cybersecurity monitoring resources.

Additionally, even when sensitive data is detected, conventional approaches may not distinguish between different contexts that materially affect risk and compliance considerations. For example, a set of detected email addresses may correspond to internal employee data or external customer data, and a set of detected payment card numbers may correspond to different brands or issuing countries associated with different regulatory considerations. Without such context, findings may be over-inclusive, under-inclusive, or improperly prioritized, and may not provide sufficient guidance for selecting monitoring workflows, escalation paths, or compliance actions.

Thus, there exists a need for an implementation of improved techniques for augmenting DSPM findings with context labels derived from additional logic applied to detected sensitive data, such that the context labels provide further characterization usable for regulatory and sensitivity assessment, and for initiating cybersecurity monitoring actions in cloud computing environments.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having hardware, firmware, firmware executing on hardware, software, software executing on hardware, or any combination of them installed on the system that, in operation, cause or causes the system to perform the actions. One or more computer programs can be configured to perform particular operations or actions by virtue of including instructions that, when executed by a data processing apparatus, cause the apparatus to perform the actions.

In one general aspect, the method may include detecting a plurality of data objects in one or more data sources of the cloud computing environment. The method may also include generating a data finding based on data detected in the cloud computing environment, where the generated data finding is associated with at least one data object of the detected plurality of data objects; obtaining metadata associated with the at least one data object via one or more provider interfaces that provide object properties without accessing payload content of the at least one data object; obtaining, selectively, one or more samples of data from the at least one data object via at least one of an optional content scan and a data sampling operation when permitted; generating a sensitive-data classification for the generated data finding by applying pattern recognition to at least a first sample of the obtained one or more samples of data; generating a context for the generated data finding based on at least one of a second sample of the obtained one or more samples of data and the obtained metadata; generating one or more context labels based on the generated context; storing, in a security database, the generated one or more context labels with a representation of the generated data finding; initiating a cybersecurity monitoring action in the cloud computing environment based on the generated data finding and at least one of the generated one or more context labels. Other embodiments of this aspect include corresponding computer systems, apparatus, and computer programs recorded on one or more computer storage devices, each configured to perform the actions of the methods.

Implementations may include one or more of the following features. The method where storing the generated one or more context labels may include storing at least a first context label at a finding level and storing at least a second context label at an object level for the at least one data object.

The method where the second sample is identical to the first sample. The method may include generating a regulatory-related context label by applying a policy or regulatory mapping to at least one contextual attribute, where the cybersecurity monitoring action is initiated based on the generated regulatory-related context label. The method may include selecting, by a gating controller, a candidate subset of data objects for at least one of the optional content scan and data sampling operation based on at least one of a policy constraint, a permission signal, the obtained metadata, and a risk indicator, where the one or more samples of data are obtained only from the candidate subset; receiving feedback indicative of a false positive associated with at least one of the generated sensitive-data classification or the generated one or more context labels; and updating at least one of customer-configured rules, overrides, allowlists, blocklists, and exceptions used to generate the context or the one or more context labels based on the received feedback.

The method where generating the context further may include determining whether an email address detected by the pattern recognition belongs to an internal employee domain or an external domain based on comparison to an employee domain store or directory; and generating a context label indicating internal or external.

The method where generating the context further may include determining a payment card brand associated with a payment card number detected by the pattern recognition, and generating a context label indicating the payment card brand.

The method where determining the payment card brand further may include: determining an issuing country or region based on a BIN/IIN mapping; and generating a context label indicating the issuing country or region. Implementations of the described techniques may include hardware, a method or process, or a computer tangible medium.

In one general aspect, the system may include one or more processors configured to: detect a plurality of data objects in one or more data sources of the cloud computing environment. The system may furthermore generate a data finding based on data detected in the cloud computing environment, where the generated data finding is associated with at least one data object of the detected plurality of data objects; obtain metadata associated with the at least one data object via one or more provider interfaces that provide object properties without accessing payload content of the at least one data object; obtain, selectively, one or more samples of data from the at least one data object via at least one of an optional content scan and a data sampling operation when permitted; generate a sensitive-data classification for the generated data finding by applying pattern recognition to at least a first sample of the obtained one or more samples of data; generate a context for the generated data finding based on at least one of a second sample of the obtained one or more samples of data and the obtained metadata; generate one or more context labels based on the generated context; store, in a security database, the generated one or more context labels with a representation of the generated data finding; initiate a cybersecurity monitoring action in the cloud computing environment based on the generated data finding and at least one of the generated one or more context labels. Other embodiments of this aspect include corresponding computer systems, apparatus, and computer programs recorded on one or more computer storage devices, each configured to perform the actions of the methods.

Implementations may include one or more of the following features. The system where the one or more processors, when storing the generated one or more context labels, are configured to store at least a first context label at a finding level and storing at least a second context label at an object level for the at least one data object.

The system where the second sample is identical to the first sample.

The system where the one or more processors are further configured to generate a regulatory-related context label by applying a policy or regulatory mapping to at least one contextual attribute, where the cybersecurity monitoring action is initiated based on the generated regulatory-related context label.

The system where the one or more processors are further configured to select, by a gating controller, a candidate subset of data objects for at least one of the optional content scan and data sampling operation based on at least one of a policy constraint, a permission signal, the obtained metadata, and a risk indicator, where the one or more samples of data are obtained only from the candidate subset.

The system where the one or more processors are further configured to receive feedback indicative of a false positive associated with at least one of the generated sensitive-data classification or the generated one or more context labels; and update at least one of customer-configured rules, overrides, allowlists, blocklists, and exceptions used to generate the context or the one or more context labels based on the received feedback.

The system where the one or more processors, when generating the context, are configured to determine whether an email address detected by the pattern recognition belongs to an internal employee domain or an external domain based on comparison to an employee domain store or directory, and generate a context label indicating internal or external.

The system where the one or more processors, when generating the context, are configured to determine a payment card brand associated with a payment card number detected by the pattern recognition, and generate a context label indicating the payment card brand.

The system where the one or more processors, when determining the payment card brand, are configured to determine an issuing country or region based on a BIN/IIN mapping, and generate a context label indicating the issuing country or region. Implementations of the described techniques may include hardware, a method or process, or a computer tangible medium.

In one general aspect, non-transitory computer-readable medium may include one or more instructions that, when executed by one or more processors of a device, cause the device to: detect a plurality of data objects in one or more data sources of the cloud computing environment; generate a data finding based on data detected in the cloud computing environment, where the generated data finding is associated with at least one data object of the detected plurality of data objects; obtain metadata associated with the at least one data object via one or more provider interfaces that provide object properties without accessing payload content of the at least one data object; obtain, selectively, one or more samples of data from the at least one data object via at least one of an optional content scan and a data sampling operation when permitted; generate a sensitive-data classification for the generated data finding by applying pattern recognition to at least a first sample of the obtained one or more samples of data; generate a context for the generated data finding based on at least one of a second sample of the obtained one or more samples of data and the obtained metadata; generate one or more context labels based on the generated context; store, in a security database, the generated one or more context labels with a representation of the generated data finding; and initiate a cybersecurity monitoring action in the cloud computing environment based on the generated data finding and at least one of the generated one or more context labels. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

FIG. 2 illustrates an example operational flowchart of a process for generating a data finding, including a sensitive-data classification, based on metadata and, when permitted, sampled data, according to at least one embodiment.

FIG. 6 illustrates an example block diagram of a computing architecture of a DSPM system, according to at least one embodiment.

DETAILED DESCRIPTION

Figure 1:
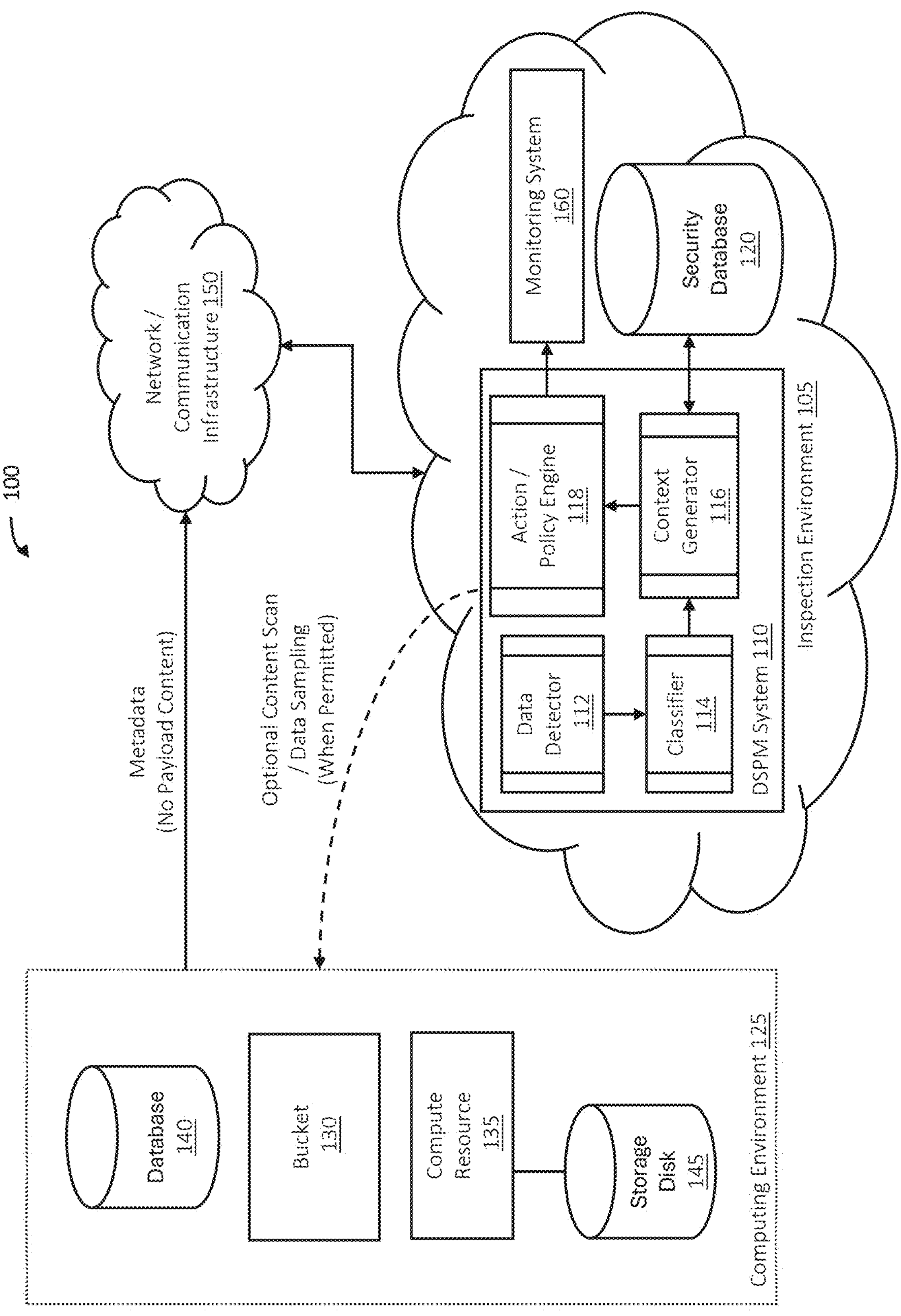
FIG. 1 illustrates an example computing environment utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the following terms have the meanings set forth below, unless the context clearly indicates otherwise. The definitions provided herein are intended to clarify the disclosed embodiments and do not limit the scope of the invention unless expressly stated. To the extent a term is not expressly defined herein, the term is intended to have its ordinary and customary meaning to a person having ordinary skill in the art (PHOSITA) at the time of filing.

"Data source" refers to a service or system that stores, references, or exposes data objects, including object storage services (e.g., buckets), databases, data lakes, file systems, backup repositories, log stores, virtual machine disks, snapshots, catalogs, and/or similar storage or data management services.

"Data object" refers to any unit of stored or addressable data in a data source, including, without limitation, a file, blob, object, document, table, view, export, snapshot, backup artifact, log artifact, configuration artifact, or other stored entity addressable by an identifier.

"Payload content" or "content" refers to the substantive contents of a data object (e.g., file bytes, object body, table cell values) as distinct from metadata. Accessing payload content includes reading, scanning, parsing, sampling, or otherwise inspecting the substantive data of the data object.

"Metadata" refers to information associated with a data object that can be obtained without accessing payload content. Metadata may include object identifiers, names, file paths or object keys, hierarchical path segments, directory depth, timestamps, size, storage properties, tags/labels, ownership attributes, access control attributes, encryption indicators, versioning indicators, content-type indicators, checksums/hashes (when available without payload access), and other non-payload properties.

"Object identifier" refers to any identifier usable to reference or locate a data object, including a URI, object key, file path, table identifier, database identifier, bucket/container identifier, resource name, or other canonical reference.

"Hierarchy" or "namespace" refers to a representation of relationships among data objects based on naming structure, location structure, or other organization. For object storage, a hierarchy may be derived from object keys and delimiters (e.g., "/") and represented as a prefix tree or trie. For databases, a hierarchy may be derived from schemas, table namespaces, and/or backup/log naming conventions.

"Hierarchy features" or "path features" refer to features derived from object identifiers and/or hierarchies, including shared prefix length, token overlap of path segments, directory depth, sibling/ancestor relationships, extension patterns, and other path-based indicators.

"Feature extraction" or "normalization" refers to processing performed on metadata to create a consistent representation and/or feature set usable for similarity determination, clustering, classification, sampling selection, and/or context label generation, including tokenization, parsing, normalization of formats, and derivation of hierarchy/path features.

"Similarity determination" refers to a process for determining similarity between data objects and/or groups of data objects based on metadata-derived features. Similarity may be computed using one or more scores, thresholds, distance measures, predicates, or other criteria, and may be based on a weighted combination of features.

"Cluster" or "data cluster" or "data grouping" refers to a group of data objects determined to be similar based on metadata-derived features. A cluster may correspond to a set of objects sharing hierarchy/path characteristics (e.g., common prefixes) and/or other metadata patterns.

"Cluster assignment" refers to an association between a data object and a cluster identifier indicating membership in a cluster.

"Cluster summary" or "aggregated cluster representation" refers to a representation of a cluster derived from aggregated metadata associated with member data objects. A cluster summary may include representative object identifiers, common path tokens, naming patterns, summary statistics of metadata fields, access control patterns, and other cluster-level indicators.

"Machine learning (ML) model" refers to a model configured to generate an output based on an input, including supervised models, unsupervised models, heuristic models, and language models. An ML model may be trained, fine-tuned, prompted, and/or otherwise configured to produce classifications, attributes, confidence values, or other outputs.

"Language model (LM)" refers to a machine learning model configured to process natural language or token sequences. A language model may be used to generate outputs based on prompts or model inputs. In at least one embodiment, an LM includes (or is) a large language model (LLM).

"Prompt" or "model input" refers to an input to an ML model derived from data, metadata, and/or an aggregated representation, such as a structured prompt, template, token sequence, or other encoded representation.

"Sensitive-data classification" refers to a classification output indicating that a data object, group of data objects, or data finding is associated with a sensitive data type. Sensitive data types may include, by way of example and not limitation, email addresses, payment card numbers, national identifiers, and/or other regulated data types.

"Pattern recognition" refers to applying one or more detection rules, predicates, regular expressions, checks, and/or classifiers to data to detect the presence of one or more sensitive data types.

"Sample" or "sampled data" refers to a subset of the payload content of a data object obtained for analysis. A sample may include one or more characters, bytes, lines, records, fields, rows, columns, segments, or other portions of payload content, and may be obtained via an optional content scan or data sampling operation when permitted.

"Data finding" or "finding" refers to a generated output that associates a sensitive-data classification with one or more data objects and/or clusters, and may include supporting evidence derived from metadata and/or sampled data, confidence, timestamps (e.g., first seen/last seen), status, and recommended monitoring actions or workflows.

"Context" refers to one or more contextual attributes derived for a data finding in addition to a sensitive-data classification, the contextual attributes being usable to assess sensitivity, regulatory exposure, risk level, and/or prioritization.

"Contextual attribute" refers to an attribute derived from at least one of sampled data, metadata, and mapping sources, including, by way of example and not limitation, internal versus external email domain indicators, payment card brand, issuing country or region, and/or other attributes indicative of regulatory exposure or sensitivity.

"Context label" refers to a discrete label value and/or key-value pair generated based on a context or contextual attribute and associated with a data finding and/or a data object. Context labels may be stored with a representation of a data finding in a security database and may be used to condition selection or initiation of cybersecurity monitoring actions.

"Mapping source" refers to a data source usable to derive a contextual attribute and/or context label, including an employee domain store or directory, a BIN/IIN mapping table, a policy or regulatory mapping table, and/or customer-configured rules, overrides, allowlists, blocklists, or exceptions.

"Customer environment" refers to a computing environment associated with a customer and including one or more cloud accounts, projects, subscriptions, tenants, regions, networks, resource groups, and/or data sources in which data objects are stored and managed, and in which metadata is obtained and analyzed for generating classifications, data findings, contexts, and context labels.

"Gating controller" or "candidate subset selection" refers to logic configured to determine whether sampling is permitted and to select a subset of data objects for optional content scanning or data sampling based on policies, permissions, risk indicators, and/or metadata-derived outputs.

"Optional content scan" or "data sampling" refers to payload-based inspection performed only when permitted and typically only on a gated candidate subset. Optional content scanning or data sampling may be used to obtain one or more samples for sensitive-data classification and/or context generation.

"Cybersecurity monitoring action" refers to an action initiated or recommended based on a data finding and/or one or more context labels, including generating an alert, opening a ticket or case, enabling enhanced telemetry or logging, adding a data object or location to a watchlist, increasing scan frequency, routing to a compliance workflow, prioritizing a queue or risk score, and/or initiating other monitoring workflows.

"Policy mapping" refers to associations between data findings, sensitive-data classifications, context labels, and one or more monitoring actions, priority levels, or workflow selections.

The method and system detect sensitive data in one or more cloud computing environments and generate data findings by obtaining and analyzing metadata associated with data objects and, when permitted, obtaining one or more samples of data from selected data objects for pattern recognition, thereby enabling scalable data discovery while reducing exposure to sensitive payload content through selective sampling. Additionally, the method and system can cluster data objects into data clusters based on similarity of metadata-derived features, including hierarchy and path features derived from bucket namespaces and/or database file paths, thereby enabling grouping of related data objects and organizing findings for efficient monitoring.

Moreover, the method and system can generate, for a data finding, a context based on additional logic applied to at least one of a sensitive-data classification, metadata, and one or more samples of data, and can generate one or more context labels based on the context, thereby providing further characterization usable to assess sensitivity, regulatory exposure, and risk level. By way of example and not limitation, the context labels may indicate whether detected email addresses correspond to internal employee domains or external domains, a payment card brand, an issuing country or region, and/or a regulatory tag derived from such contextual attributes.

Furthermore, the method and system can store context labels with representations of data findings in a security database and can initiate cybersecurity monitoring actions based on the data findings and the context labels, thereby enabling allocation of constrained cybersecurity monitoring resources based on contextualized findings. Also, the method and system can perform gated optional content scanning or data sampling based on policy constraints to obtain one or more samples used for sensitive-data classification and context generation, thereby minimizing payload access while enabling selective detection and contextualization. In at least one embodiment, the method and system can generate data findings that include representative object identifiers (e.g., file paths or object keys), status, and time-based attributes, such as first-seen and last-seen indicators, and support serialized export (e.g., JSON), thereby enabling actionable reporting, auditing, and downstream monitoring workflows in data security posture management (DSPM) environments.

The disclosed embodiments are operable within a variety of computing architectures and communication environments and are not limited to any particular hardware, software, or network configuration discussed herein. The embodiments may be implemented across heterogeneous environments, including on-premises systems, cloud-based infrastructures, hybrid deployments, edge-based systems, and distributed computing environments, and may operate across multiple cloud providers, accounts, regions, and data source types.

The disclosed method is not a mental process and cannot be performed entirely in the human mind. Rather, the method involves technical operations that are executed within a computing environment and are tied to specific technological implementations. For example, the method includes: (i) detecting data objects in cloud data sources, such as object storage buckets and databases; (ii) obtaining and normalizing metadata associated with the data objects via provider interfaces without accessing payload content; (iii) selecting, when permitted, a subset of data objects for optional content scanning or data sampling and obtaining one or more samples of data; (iv) performing pattern recognition on at least one sample to generate a sensitive-data classification for a data finding; (v) generating a context for the data finding based on at least one of the sensitive-data classification, metadata, and a second sample of the data, wherein the second sample may be identical to the first sample; (vi) generating one or more context labels based on the context and storing the one or more context labels with a representation of the data finding in a security database; and (vii) initiating a cybersecurity monitoring action in the cloud computing environment based on the data finding and the one or more context labels.

The operation and effectiveness of the disclosed system and method depend on a variety of technical factors, including, without limitation, the availability and structure of provider-exposed metadata, heterogeneity of metadata schemas across cloud services, scale and churn of cloud inventories, permissions and policy constraints governing payload access and sampling, accuracy and performance of pattern recognition logic, availability and freshness of mapping sources (e.g., employee domain lists, BIN/IIN mappings), configuration of regulatory and policy mappings, and computing resource constraints associated with metadata collection, sampling, and context label generation. The method may dynamically modify the selection of the sampling scope and initiation of monitoring workflows based on observed classifications, derived context labels, and policy constraints. Such dynamic modification requires automated processing at machine scale and is not practically performable by a human operator without the use of computing systems.

Although a human operator may review findings, configure policies, configure mapping sources, or tune thresholds, execution of metadata acquisition, optional content scanning or data sampling, pattern recognition classification, context derivation, context label generation, storage of context labels with data findings, and initiation of cybersecurity monitoring actions remains rooted in automated processing performed by computing systems. In particular, at runtime, the operational steps involved in enumerating large inventories of data objects, selectively obtaining samples under permission constraints, applying pattern recognition at scale, deriving contextual attributes, generating context labels, and dispatching monitoring workflows are performed autonomously by the system without requiring human intervention at that time.

Accordingly, the disclosed embodiments are directed to a practical application of computer technology to solve a specific technical problem in the field of data security posture management for cloud environments. In particular, the disclosed embodiments improve the actionability of sensitive-data findings by augmenting findings with context labels derived from sampled data and mapping sources, reduce exposure to sensitive payload content by selectively gating sampling operations, and improve prioritization and scalability of cybersecurity monitoring workflows across heterogeneous cloud data sources, all of which are necessarily rooted in computing technology.

FIG. 1 illustrates an example operating environment 100 for detecting sensitive data in a cloud computing environment, generating data findings, generating and storing context labels associated with the data findings, and initiating cybersecurity monitoring actions based on the data findings and the context labels, utilized to describe the various disclosed embodiments that may be implemented.

The operating environment 100 illustrated in FIG. 1 includes a data security posture management (DSPM) system 110 (hereinafter referred to as "system 110"), a security database 120, and a monitoring system 160, deployed within an inspection environment 105, and one or more data sources deployed within a computing environment 125, such as a bucket 130, a database 140, a compute resource 135, and a storage disk 145, communicatively coupled via a network or communication infrastructure 150.

System 110 is configured to discover data objects in one or more computing environments, obtain metadata associated with the data objects, obtain one or more samples of data from selected data objects when permitted, generate sensitive-data classifications based on the metadata and/or the one or more samples, generate data findings, generate contexts and context labels associated with the data findings, store the context labels with representations of the data findings in security database 120, and initiate or recommend cybersecurity monitoring actions based on the data findings and the context labels.

In at least one embodiment, system 110 is further configured to detect a plurality of data objects in computing environment 125 and to obtain metadata associated with the data objects without obtaining payload content of the data objects. For example, bucket 130, database 140, compute resource 135, and/or storage disk 145 may expose metadata via respective provider interfaces, whereby metadata includes one or more object properties, such as object identifiers, names, file paths or object keys, hierarchical path segments, timestamps, sizes, storage properties, tags or labels, access control attributes, and/or other non-payload indicators. In at least one embodiment, system 110 obtains metadata via one or more provider APIs, inventory interfaces, event interfaces, or other metadata-access mechanisms that do not require reading file contents or other payload content.

In at least one embodiment, system 110 is further configured to perform sensitive-data detection and classification based on one or more samples of data obtained from selected data objects. In at least one embodiment, the samples are obtained via an optional content scan or data sampling operation when permitted by policy, configuration, or access controls. For example, system 110 may apply pattern recognition to a sample to determine whether the sample includes sensitive data of a given type (e.g., an email address, a payment card number, an other regulated data type), and may generate or update a data finding based on the results of the pattern recognition. In at least one embodiment, system 110 stores the data finding and associated attributes in security database 120 for reporting, auditing, and/or downstream action selection.

In at least one embodiment, computing environment 125 is a set of computing resources in which data objects may be stored and accessed, including public cloud infrastructure, private cloud infrastructure, on-premises infrastructure, edge resources, or combinations thereof. In at least one embodiment, computing environment 125 corresponds to a customer cloud computing environment including one or more cloud accounts, projects, subscriptions, tenants, regions, networks, or resource groups in which data objects are stored. Bucket 130 may include an object store or other storage service configured to store a plurality of data objects. Database 140 may include a managed database service and/or database system configured to store data objects, such as tables, files, exports, snapshots, backups, logs, or other database-associated artifacts. Compute resource 135 may include a virtual machine, container workload, or other compute resource associated with stored data objects. Storage disk 145 may include a virtual disk, volume, snapshot, or other storage medium associated with the compute resource 135.

In at least one embodiment, inspection environment 105 is a computing environment in which system 110 performs analysis, classification, and/or control selection, and in which findings, rules, and related outputs may be stored. In at least one embodiment, inspection environment 105 is a cloud computing environment (distinct from computing environment 125) (not shown). The cloud computing environment may be implemented using public cloud infrastructure, private cloud infrastructure, on-premises computing resources, edge computing resources, or combinations thereof. The cloud computing environment may include, for example, a cloud provider environment (e.g., Google® Cloud Platform [GCP] environment) or similar platforms.

In at least one embodiment, communications between computing environment 125 and inspection environment 105 include transmission of metadata without payload content, as illustrated by the metadata flow via network or communication infrastructure 150. By limiting communications to metadata, system 110 may reduce exposure to sensitive data contents while enabling discovery, finding generation, and action selection.

In at least one embodiment, system 110 supports an optional content scan and/or data sampling operation when permitted. The optional content scan and/or data sampling operation may be performed for a subset of data objects selected based on policy constraints, permissions, risk indicators, and/or metadata-derived signals, such that payload access is selectively invoked to obtain one or more samples rather than universally applied across all data objects. In at least one embodiment, the one or more samples include a first sample usable for sensitive-data classification and a second sample usable for context generation, and the second sample may be identical to the first sample.

In at least one embodiment, system 110 is further configured to generate a context for a data finding and to generate one or more context labels based on the context. In at least one embodiment, generating the context includes applying additional logic to the sensitive data, the data finding, and/or the one or more samples to derive contextual attributes, such as whether an email address belongs to an internal employee domain or an external domain, a payment card brand, an issuing country or region, or other attributes indicative of regulatory exposure or sensitivity. In at least one embodiment, system 110 stores one or more context labels with a representation of the data finding in security database 120, and the context labels may be stored at a finding level and/or at an object level.

In at least one embodiment, monitoring system 160 is configured to receive, from system 110, one or more signals indicative of a cybersecurity monitoring action and to initiate monitoring workflows based on the data finding and the associated context label(s). Example cybersecurity monitoring actions include, without limitation, prioritizing a queue or risk score, generating an alert, opening a ticket or case, enabling enhanced telemetry or logging for an affected location, adding a data object or location to a watchlist, increasing scan frequency, routing to a compliance workflow, and/or initiating other monitoring or response workflows. In at least one embodiment, monitoring system 160 may include (or is) a security information and event management (SIEM) system, a security orchestration, automation, and response (SOAR) system, a ticketing or case management system, an alerting system, or combinations thereof.

In at least one embodiment, security database 120 is a repository configured to store data findings, sensitive-data classifications, contexts, context labels, timestamps, status values, and other security-related outputs. The security database 120 may be implemented using one or more databases, key-value stores, indexes, file systems, or other data storage mechanisms. The security database 120 may be realized using any suitable storage architecture. In at least one embodiment, the security database 120 is implemented as cloud-based storage, including object-storage services, managed database services, distributed file systems, or virtualized storage volumes provided by a cloud infrastructure.

Network or communication infrastructure 150 provides communication pathways that enable data exchange between computing environment 125 and inspection environment 105. Communication infrastructure 150 may include one or more networks, buses, gateways, communication links, or interconnects, and may support distributed, remote, or cross-cloud deployment of the illustrated components. The illustrated connections represent logical associations and are not intended to limit physical deployment configurations.

It will be appreciated that the diagram of FIG. 1 is provided for purposes of illustration and is not intended to limit the disclosed embodiments to the specific architecture, arrangement of components, or configuration shown therein. Additionally, fewer or alternative components may be included, and the illustrated components may be combined, separated, or implemented in different forms without departing from the scope of the present disclosure. Additionally, the illustrated components may represent logical associations rather than physical network links, and the functionality described with respect to each component may be distributed across multiple computing resources.

FIG. 2 is an operational flowchart diagram illustrating a method 200 (also referred to as "process 200") for detecting data objects, obtaining metadata associated with the data objects, generating one or more classifications, including a sensitive-data classification, and generating one or more data findings based on the classification(s), according to at least one embodiment. In at least one embodiment, the method 200 may be performed by a system, such as the data security posture management (DSPM) system 110 shown in FIGS. 1 and 4. The method 200 is discussed with reference to the elements shown in FIG. 1. In at least one embodiment, a data finding generated by process 200 is subsequently enriched with one or more context labels, as described with respect to FIG. 3.

At S210, a plurality of data objects is detected. In at least one embodiment, detecting the plurality of data objects includes discovering, enumerating, or otherwise identifying data objects stored in one or more data sources within a computing environment (e.g., computing environment 125), such as a bucket 130, a database 140, a compute resource 135, and/or a storage disk 145. The detected data objects may include, without limitation, files, blobs, objects, tables, exports, snapshots, backups, log artifacts, model artifacts, configuration artifacts, or other stored units addressable by a cloud provider interface. In at least one embodiment, system 110 detects the data objects across multiple cloud platforms, multiple accounts, multiple regions, and/or multiple data repositories associated with a customer environment 125.

At S220, metadata is obtained for each of the detected plurality of data objects. In at least one embodiment, the metadata is obtained via one or more provider interfaces (e.g., APIs, inventory listings, catalog services, metadata endpoints, event streams, file system interfaces) configured to return object properties without returning payload content of the data objects. In at least one embodiment, obtaining metadata includes extracting the metadata from one or more provider interfaces without accessing payload content. The obtained metadata may include, by way of example and not limitation, object identifiers, names, file paths or object keys, hierarchical path segments, directory depth, timestamps, size, storage properties, tags or labels, ownership attributes, access control attributes, encryption indicators, versioning indicators, content-type indicators, and/or other non-payload properties. In at least one embodiment, system 110 normalizes the obtained metadata into a common representation for use across heterogeneous sources.

At S230, the detected plurality of data objects are clustered into groups based on the obtained metadata. In at least one embodiment, clustering includes computing similarity between pairs of data objects and assigning the data objects to one or more data groupings (also referred to as "clusters") based on the similarity. Similarity may be determined using one or more metadata-derived features, such as shared file path prefixes, overlap of tokenized path segments, directory depth proximity, naming conventions, extension or suffix patterns, timestamp distributions, size distributions, storage location proximity, tag similarity, and/or access control similarity. In at least one embodiment, file paths or object keys are used as primary clustering signals, such that clusters correspond to groups of data objects associated with a common hierarchy region of a namespace tree. For example, system 110 may derive hierarchy/path features by parsing an object key or file path into segments, determining a depth within a hierarchy, and determining one or more tokens associated with the object, and may assign objects to a common cluster when a similarity determination (e.g., based on shared prefix length and token overlap) satisfies one or more thresholds. In at least one embodiment, system 110 performs clustering in an incremental manner by updating cluster assignments as additional data objects are detected or metadata changes are observed.

At S240, a classification is generated for each of the data groupings. In at least one embodiment, the classification includes a sensitive-data classification indicative of whether one or more data objects of a grouping are associated with a sensitive data type (e.g., email addresses, payment card numbers, other regulated data types). In at least one embodiment, system 110 determines the sensitive-data classification based on one or more samples of data obtained via an optional content scan or data sampling operation when permitted, and applies pattern recognition to the one or more samples to detect one or more sensitive data types. In at least one embodiment, system 110 additionally generates one or more metadata-based classifications for a grouping based on aggregated metadata associated with the grouping.

At S250, a data finding is generated based on each generated classification. In at least one embodiment, a data finding includes an association between a classification and one or more data objects and/or a cluster, and may further include supporting evidence derived from metadata and/or sampling results, a confidence score, a time of detection, and/or recommended monitoring actions. The data finding may identify affected locations (e.g., buckets, prefixes, databases, schemas), impacted objects, and/or an inferred dataset purpose. In at least one embodiment, the data finding is stored in a security database (e.g., security database 120) and is made available for reporting, alerting, and/or downstream monitoring action selection. In at least one embodiment, the data finding includes or is associated with a sensitive-data classification and is subsequently enriched with one or more context labels, as described with respect to FIG. 3.

Although FIG. 2 shows example blocks of the method 200, in some implementations, process 200 may include additional blocks, fewer blocks, different blocks, or differently arranged blocks than those depicted in FIG. 2. Additionally, or alternatively, two or more of the blocks of process 200 may be performed in parallel. For example, obtaining metadata at S220 may be performed concurrently for data objects across different sources, clustering at S230 may be performed continuously or periodically, and classification at S240 may be performed for newly formed or updated clusters while other clusters remain unchanged. In at least one embodiment, process 200 is performed periodically or continuously such that newly detected or changed data objects are processed to generate updated data findings over time, and previously generated findings may be updated to reflect changes in detected sensitive-data classifications, locations, or status values.

Figure 3:
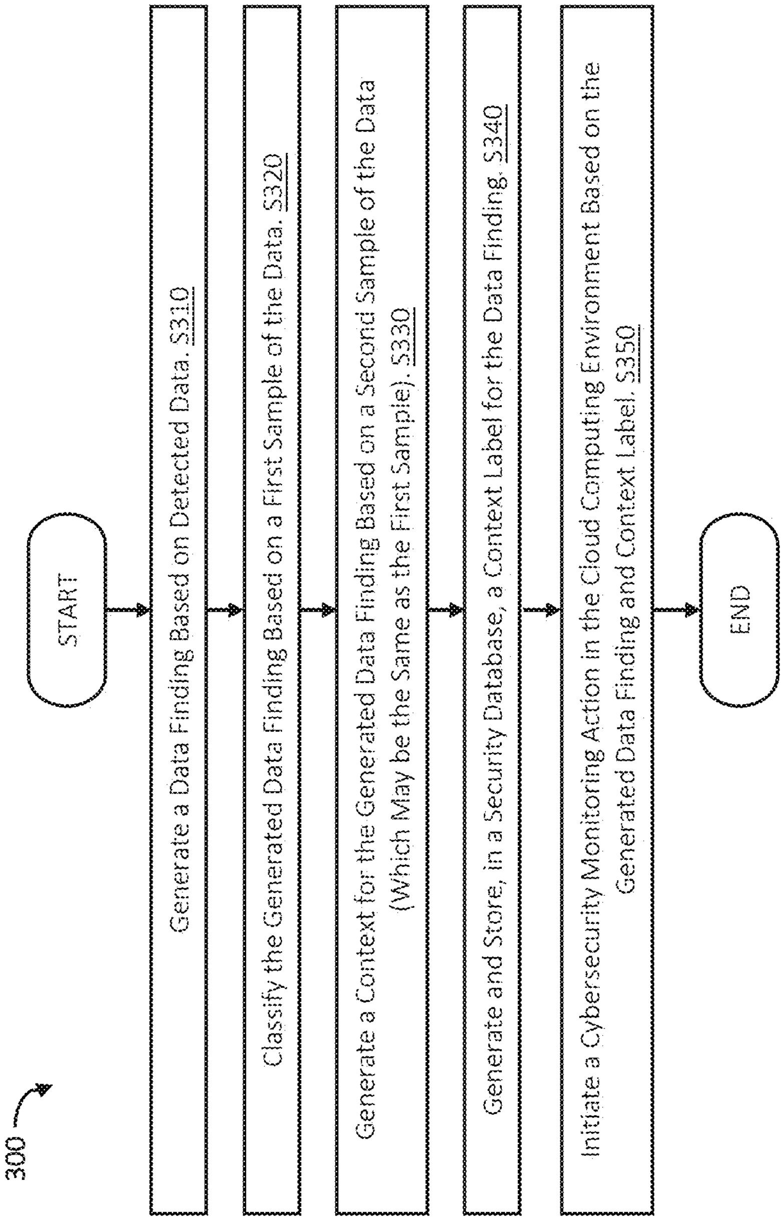
FIG. 3 illustrates an example operational flowchart of a process for generating a context for a data finding, generating and storing one or more context labels for the data finding, and initiating a cybersecurity monitoring action based on the data finding and the one or more context labels, according to at least one embodiment.

FIG. 3 is an operational flowchart diagram illustrating a method 300 (also referred to as "process 300") for generating a context for a data finding, generating and storing one or more context labels associated with the data finding, and initiating a cybersecurity monitoring action based on the data finding and the one or more context labels, according to at least one embodiment. In at least one embodiment, the method 300 may be performed by a system, such as the data security posture management (DSPM) system 110 shown in FIGS. 1 and 4, and may initiate a monitoring action via a monitoring system 160. The method 300 is discussed with reference to the elements shown in FIGS. 1 and 2.

At S310, a data finding is generated based on data detected in a cloud computing environment (e.g., computing environment 125). In at least one embodiment, the data finding includes a representation of one or more detected data objects and an associated sensitive-data classification indicating a sensitive data type detected in at least one sample of the data (e.g., an email address, a payment card number, an other regulated data type). In at least one embodiment, the data finding is generated according to process 200 of FIG. 2 and stored in security database 120.

At S320, a classification is generated for the data finding based on a first sample of the data. In at least one embodiment, generating the classification includes obtaining the first sample via an optional content scan or data sampling operation when permitted, and applying pattern recognition to the first sample to detect one or more sensitive data types. In at least one embodiment, generating the classification includes generating a sensitive-data classification indicative of a detected sensitive data type and associating the sensitive-data classification with the data finding.

At S330, a context for the data finding is generated based on a second sample of the data. In at least one embodiment, the second sample is identical to, i.e., the same as, the first sample. In at least one embodiment, generating the context includes applying additional logic to the second sample and/or to the data finding to determine one or more contextual attributes usable to further characterize the sensitive data for regulatory exposure, sensitivity assessment, and/or risk assessment. By way of example and not limitation, the contextual attributes may include whether an email address belongs to an internal employee domain or an external domain, a payment card brand, an issuing country or region associated with a payment card number, and/or other attributes derived from the second sample.

At S340, one or more context labels are generated based on the generated context and stored in security database 120. In at least one embodiment, generating the one or more context labels includes mapping one or more contextual attributes to one or more discrete label values and/or key-value pairs using one or more mapping sources, such as an employee domain store or directory, a BIN/IIN mapping datastore, a policy or regulator mapping datastore, and/or customer-configured rules or overrides. In at least one embodiment, storing the one or more context labels includes storing the one or more context labels with a representation of the data finding in security database 120. In at least one embodiment, the one or more context labels are stored at a finding level and/or at an object level for one or more data objects associated with the data finding.

At S350, a cybersecurity monitoring action is initiated in the cloud computing environment 125 based on the data finding and the one or more context labels. In at least one embodiment, determining the cybersecurity monitoring action includes selecting one of a plurality of monitoring workflows based on at least one of the sensitive-data classification, one or more context labels, confidence information, and one or more policy mappings. In at least one embodiment, initiating the cybersecurity monitoring action includes transmitting, to monitoring system 160, a signal indicative of a selected monitoring workflow conditioned on at least one context label. Example cybersecurity monitoring actions include, without limitation, prioritizing a queue or risk score, generating an alert, opening a ticket or case, enabling enhanced telemetry or logging for an affected location, adding a data object or location to a watchlist, increasing scan frequency, routing to a compliance workflow, and/or initiating other monitoring workflows.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel. For example, classifications and contexts may be generated concurrently for multiple findings, or context label generation may be performed asynchronously as additional mapping data sources become available.

Figure 4:
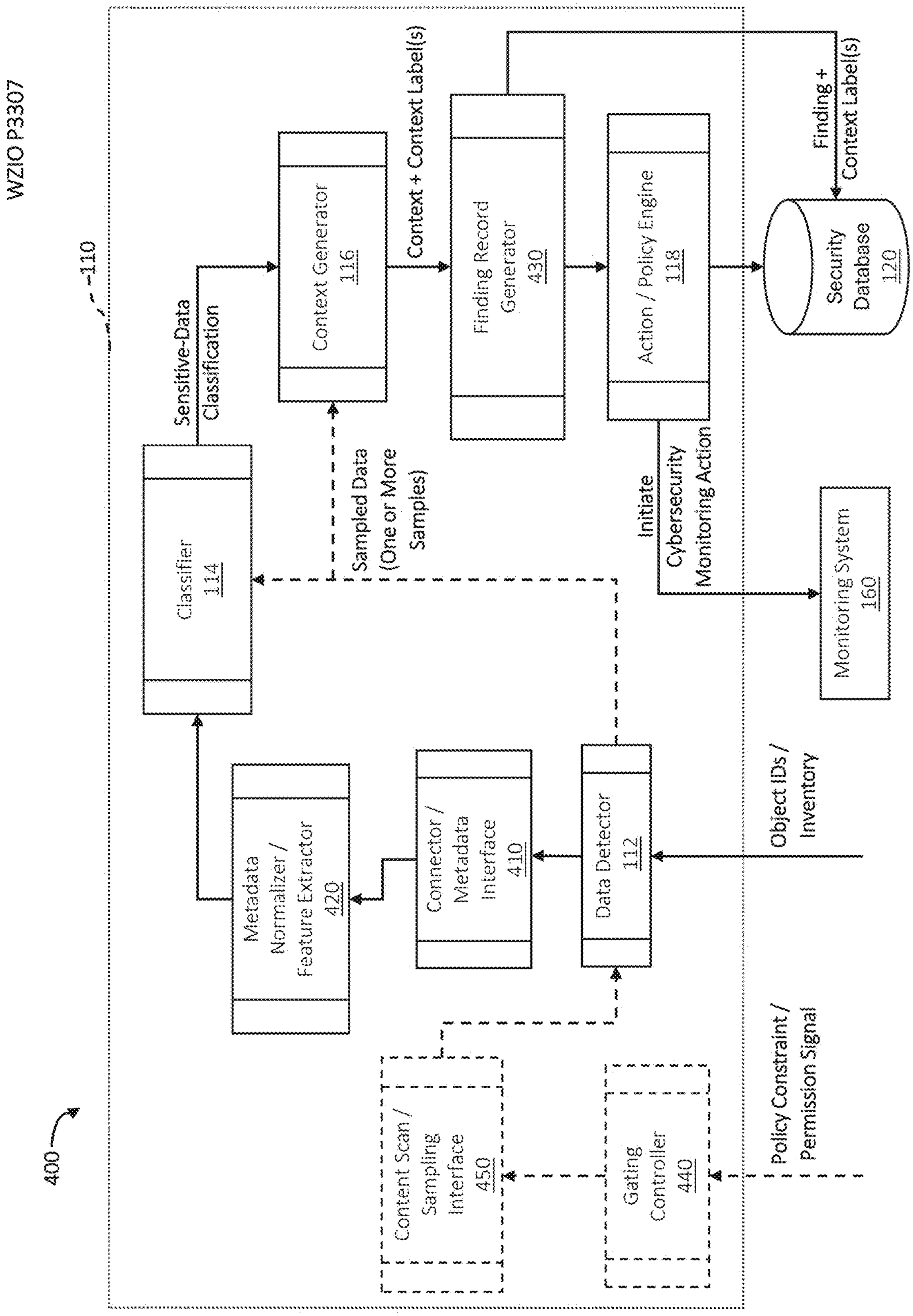
FIG. 4 illustrates an example functional diagram of a portion of the data security posture management (DSPM) system for obtaining metadata and sampled data, generating sensitive-data classifications, generating contexts and context labels for data findings, storing context labels with representations of data findings in a security database, and initiating cybersecurity monitoring actions, according to at least one embodiment.

FIG. 4 illustrates an example functional diagram 400 of a portion of the data security posture management (DSPM) system 110 according to at least one embodiment. As shown in FIG. 4, system 110 may be decomposed into a plurality of logical subcomponents that cooperate to obtain metadata associated with detected data objects, obtain one or more samples of data when permitted, generate a sensitive-data classification, generate a context and one or more context labels for a data finding, store the context label(s) with a representation of the data finding in a security database, and initiate a cybersecurity monitoring action based on the data finding and the context label(s), as described herein. In the illustrated embodiment, the logical subcomponents include connector/metadata interface 410, metadata normalizer/feature extractor 420, data detector 112, classifier 114, context generator 116, finding record generator 430, gating controller 440, content scan/sampling interface 450, and action/policy engine 118. The components illustrated in FIG. 4 represent select functional modules of system 110 and their arrangement is provided for purposes of explanation rather than limitation.

In at least one embodiment, connector/metadata interface 410 is configured to obtain object identifiers and/or inventory information (e.g., object keys, URIs, table identifiers) for data objects stored in one or more data sources, and to obtain metadata for the data objects via one or more provider interfaces. Connector/metadata interface 410 may obtain metadata without obtaining payload content of the data objects. The metadata may include, by way of example and not limitation, object identifiers, names, file paths or object keys, hierarchical path segments, timestamps, size, storage properties, tags or labels, access control attributes, encryption indicators, versioning indicators, and/or other non-payload properties. In at least one embodiment, connector/metadata interface 410 provides the obtained metadata to downstream modules of system 110 for feature generation and/or data finding generation. In at least one embodiment, connector/metadata interface 410 includes (or is) one or more connector components and one or more analyzers configured to discover data objects in one or more data sources and to obtain metadata associated with the data objects via one or more provider interfaces without accessing payload content.

In at least one embodiment, metadata normalizer/feature extractor 420 is configured to transform raw metadata obtained by connector/metadata interface 410 into metadata features usable for downstream processing. For example, metadata normalizer/feature extractor 420 may normalize field formats across heterogeneous sources, tokenize names and path segments, derive hierarchy/path features (e.g., prefix, depth, token frequency), and compute additional metadata-derived attributes (e.g., timestamp distributions, size bins, tag vectors, access-control similarity indicators). In at least one embodiment, metadata normalizer/feature extractor 420 provides metadata features to one or more of data detector 112 and classifier 114 for use as auxiliary signals for sampling selection and/or classification. In at least one embodiment, metadata normalizer/feature extractor 420 includes (or is) one or more feature generation components and one or more analyzers configured to normalize metadata across heterogeneous sources, tokenize names and path segments, and generate metadata-derived features, including hierarchy and path features.

In at least one embodiment, data detector 112 is configured to obtain one or more samples of data from selected data objects when permitted and to provide sampled data to downstream modules for sensitive-data classification and context generation. In at least one embodiment, data detector 112 selects data objects for sampling based on metadata-derived signals, policies, permissions, and/or risk indicators, and coordinates sampling via content scan/sampling interface 450. In at least one embodiment, data detector 112 includes (or is) one or more detection components and one or more analyzers configured to perform pattern recognition preparation, sampling orchestration, and/or sample extraction without requiring full payload access to each data object.

In at least one embodiment, classifier 114 is configured to generate a sensitive-data classification based on at least one sample of data obtained by data detector 112. In at least one embodiment, classifier 114 applies pattern recognition to the sample to detect one or more sensitive data types (e.g., email addresses, payment card numbers, other regulated data types), and outputs a sensitive-data classification that is usable to generate or update a data finding. In at least one embodiment, classifier 114 includes (or is) one or more classification components and one or more analyzers configured to apply pattern recognition logic and generate sensitive-data classifications based on sampled data.

In at least one embodiment, context generator 116 is configured to generate a context for a data finding and to generate one or more context labels based on the context. In at least one embodiment, context generator 116 receives, as input, at least one sensitive-data classification from classifier 114 and one or more samples of data from data detector 112, and applies additional logic to derive contextual attributes. By way of example and not limitation, the contextual attributes may include whether an email address belongs to an internal employee domain or an external domain, a payment card brand, an issuing country or region, and/or other attributes indicative of regulatory exposure, sensitivity, or risk. Context generator 116 outputs context and/or context label(s) to finding record generator 430 for storage with a representation of the data finding. In at least one embodiment, context generator 116 includes (or is) one or more context derivation components and one or more analyzers configured to derive contextual attributes and generate context labels from sampled data and sensitive-data classifications.

In at least one embodiment, finding record generator 430 is configured to generate and/or update a data finding record, and to store the data finding record with one or more context labels in security database 120. In at least one embodiment, finding record generator 430 generates a data finding that associates a sensitive-data classification with one or more data objects and includes one or more context labels derived by context generator 116. In at least one embodiment, the data finding record includes affected object identifiers, locations, a sensitive-data classification, context label(s), timestamps, and/or status values. In at least one embodiment, finding record generator 430 outputs the data finding record (including context label(s)) to security database 120 for storage, reporting, and downstream monitoring action selection. In at least one embodiment, finding record generator 430 includes (or is) one or more finding record components and one or more analyzers configured to maintain representations of data findings and associated context labels.

In at least one embodiment, system 110 supports optional content scanning and/or data sampling when permitted. In the illustrated embodiment 400, gating controller 440 is configured to determine whether sampling is permitted and to select a candidate subset and/or sampling scope based on one or more policy constraints, permissions, and/or metadata-derived signals. The gating controller 440 may output the candidate subset and/or sampling scope to content scan/sampling interface 450. Content scan/sampling interface 450 is configured to obtain one or more samples of data from the candidate subset when permitted and provide sampled data to data detector 112 for use by classifier 114 and context generator 116. In at least one embodiment, gating controller 440 includes (or is) one or more selection components and one or more analyzers configured to enforce sampling permissions and select sampling scope. In at least one embodiment, content scan/sampling interface 450 includes (or is) one or more scanning components and one or more analyzers configured to obtain sampled data from selected data objects using pattern recognition or other scanning techniques when permitted.

In at least one embodiment, action/policy engine 118 is configured to initiate a cybersecurity monitoring action based on a data finding and associated context label(s). In at least one embodiment, action/policy engine 118 selects one of a plurality of monitoring workflows based on the sensitive-data classification, context label(s), confidence, and/or policy mappings, and transmits an action signal to monitoring system 160 to initiate the selected monitoring workflow. In at least one embodiment, the monitoring action includes generating an alert, opening a ticket or case, enabling enhanced telemetry or logging, adding a data object or location to a watchlist, increasing scan frequency, and/or routing to a compliance workflow. In at least one embodiment, action/policy engine 118 includes (or is) one or more policy evaluation components and one or more analyzers configured to map findings and context labels to monitoring actions under one or more policy constraints.

It will be appreciated that the functional arrangement illustrated in FIG. 4 is exemplary and that additional, fewer, or alternative functional engines or modules may be included within system 110 without departing from the scope of the disclosed embodiments herein. The illustrated connections may represent logical data flows rather than physical connections, and the described functionality may be distributed across multiple computing resources or combined into a single module, depending on implementation requirements.

It should be noted that system 110 and any of its modules 112, 114, 116, 118, 410, 420, 430, 440, and 450 may be implemented as software, hardware, or a combination thereof. In at least one embodiment, system 110 may be realized as just-in-time compiled software code. As used herein, the term "software" refers to one or more sequences of instructions, logic, or routines, including, but not limited to, source code, object code, intermediate code, interpretable code, or executable code, that may be stored on a non-transitory computer-readable medium and executed by one or more processors. The software may be implemented using one or more machine learning frameworks, including, but not limited to, TensorFlow™, PyTorch™, ONNX™, or equivalent platforms. The software may be executed in virtualized environments, such as containers, virtual machines, or serverless architectures, or may be deployed via cloud infrastructure.

In at least one embodiment, the system 110 is executed on a hardware layer (not shown in FIG. 4). The term "hardware" refers to one or more physical computing devices or components capable of performing operations, including model training, inference, and/or data processing. Non-limiting examples of hardware include central processing units (CPUs), graphics processing units (GPUs), tensor processing units (TPUs), application-specific integrated circuits (ASICs), field programmable gate arrays (FPGAs), neural processing units (NPUs), or equivalent dedicated AI accelerators, on-device microcontrollers, or edge processors capable of running trained models, and the like. The described embodiments are not limited to any particular implementation platform and may be deployed across heterogeneous environments comprising combinations of the above. An example hardware layer implementation of the system 110 in hardware is shown in FIG. 6.

Figure 5:
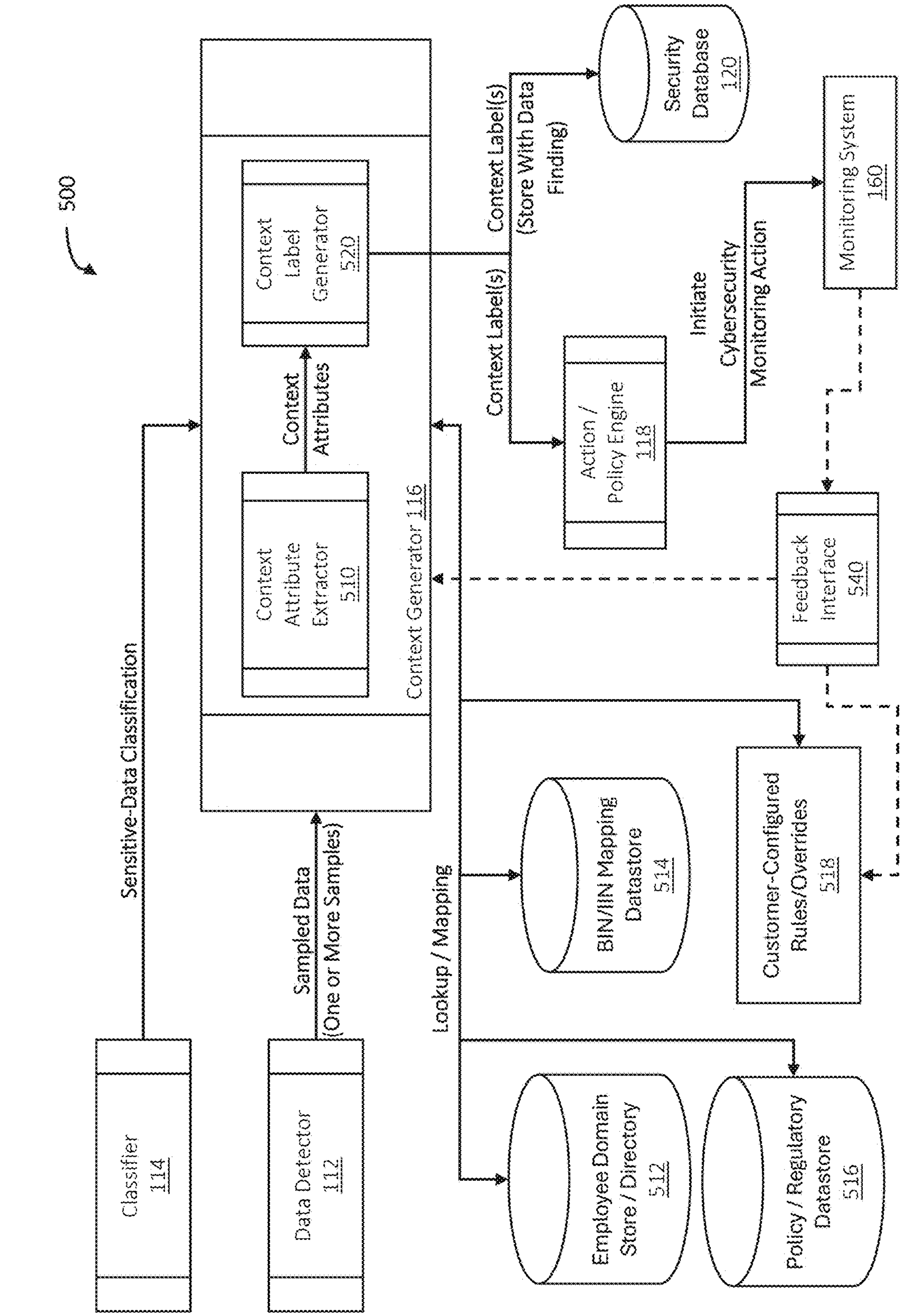
FIG. 5 illustrates an example functional diagram for deriving context labels based on sampled data, sensitive-data classifications, and one or more mapping sources, and for initiating cybersecurity monitoring actions based on the derived context labels, according to at least one embodiment.

FIG. 5 illustrates an example functional diagram 500 for deriving one or more context labels for a data finding and for initiating a cybersecurity monitoring action based on the one or more context labels, according to at least one embodiment. In at least one embodiment, the functional modules and data flows illustrated in FIG. 5 are implemented by a data security posture management (DSPM) system 110 (FIG. 1), and in particular, may be implemented by context generator 116 and action/policy engine 118 described with respect to FIGS. 1 and 4.

In the illustrated embodiment 500, context generator 116 receives, as inputs, a sensitive-data classification and sampled data. The sensitive-data classification may be generated by classifier 114 based on pattern recognition applied to at least one sample of data obtained from a data object, and may indicate a sensitive data type detected in the sample (e.g., an email address, a payment card number, an other regulated data type). Sampled data may include one or more samples of data obtained from one or more data objects via an optional content scan or data sampling operation when permitted. In at least one embodiment, sampled data includes a first sample used to generate the sensitive-data classification and a second sample used for context generation, and the second sample may be identical to the first sample.

In at least one embodiment, context generator 116 includes a context attribute extractor 510 configured to derive one or more contextual attributes based on at least one of the sensitive-data classification, the sampled data, and one or more mapping sources. By way of example and not limitation, the contextual attributes may include whether an email address belongs to an internal employee domain or an external domain, a payment card brand, an issuing country or region, and/or other attributes usable to assess regulatory exposure, sensitivity, and/or risk. In at least one embodiment, context attribute extractor 510 applies format-specific logic conditioned on the sensitive-data classification, such that different attribute derivation logic is applied for different sensitive data types (e.g., email versus payment card).

In at least one embodiment, context generator 116 includes a context label generator 520 configured to generate one or more context labels based on the derived contextual attributes. A context label may include a discrete label value and/or key-value pair indicative of a contextual attribute and usable to further characterize a sensitive-data finding. By way of example and not limitation, context labels may include labels indicating internal versus external email, payment card brand (e.g., Visa®, Mastercard®, American Express®), issuing country, regional categorization (e.g., EU-issued), and/or regulatory tags (e.g., GDPR-related labels). In at least one embodiment, context label generator 520 generates a plurality of context labels for a single data finding and/or generates context labels at multiple scopes, including at a finding level and/or at an object level for one or more data objects associated with the data finding.

In at least one embodiment, context generator 116 obtains mapping information from one or more auxiliary sources to derive contextual attributes and generate context labels. In the illustrated embodiment 500, the auxiliary sources include an employee domain store and/or directory 512, a BIN/IIN mapping datastore 514, a policy and/or regulatory mapping datastore 516, and customer-configured rules and/or overrides 518. The employee domain store and/or directory 512 may include one or more internal domains associated with an organization and may be used to determine whether an email address is internal or external. The BIN/IIN mapping datastore 514 may include mappings from payment card number prefixes to a card brand and/or an issuing country or region. The policy and/or regulatory mapping datastore 516 may include mappings between contextual attributes (e.g., issuing country or region) and policy constraints or regulatory considerations (e.g., EU residency considerations), and may be used to derive regulatory-related context labels. Customer-configured rules and/or overrides 518 may include tenant-specific configurations, allowlists, blocklists, exceptions, thresholds, and/or feedback-derived overrides that adjust how context labels are generated and/or applied.

In at least one embodiment, context label(s) generated by context generator 116 are stored with a representation of the data finding in security database 120. As illustrated in FIG. 5, context label(s) are provided to security database 120 with an association to the data finding record, such that the security database 120 stores the context label(s) with the data finding and makes the context label(s) available for reporting, auditing, and downstream action selection. In at least one embodiment, security database 120 additionally stores one or more of the auxiliary sources 512, 514, and 516, or references thereto, and context generator 116 retrieves mapping information from security database 120 as part of context label generation.

In at least one embodiment, context label(s) are additionally provided to an action/policy engine 118 configured to initiate a cybersecurity monitoring action conditioned on the context label(s). Action/policy engine 118 may select one of a plurality of monitoring workflows based on the sensitive-data classification, the context label(s), confidence information, and/or policy mappings. Action/policy engine 118 outputs a monitoring action signal to monitoring system 160 to initiate the selected monitoring workflow. Example monitoring actions include, without limitation, prioritizing a queue or risk score, generating an alert, opening a ticket or case, enabling enhanced telemetry or logging for an affected location, adding a data object or location to a watchlist, increasing scan frequency, routing to a compliance workflow, and/or initiating other monitoring workflows.

In at least one embodiment, a feedback interface 540 is configured to receive feedback indicative of false positives, labeling errors, or policy exceptions associated with one or more findings and/or context labels. The feedback may be provided via a support channel, user interface, API, or other mechanism. In at least one embodiment, the feedback is used to update customer-configured rules and/or overrides 518 and/or to adjust mapping data used by context generator 116, thereby enabling refinement of context label generation over time.

It will be appreciated that the functional arrangement illustrated in FIG. 5 is exemplary and that additional, fewer, or alternative functional modules, data sources, and mappings may be included without departing from the scope of the disclosed embodiments herein. The illustrated connections may represent logical data flows rather than physical connections, and the described functionality may be distributed across multiple computing resources or combined into a single module, depending on implementation requirements.

FIG. 6 is an example block diagram of a computing architecture of the data security posture management (DSPM) system 110.

The DSPM system 110 includes a processing circuitry 610 coupled to a memory 620, a storage 630, and a network interface 640. In an embodiment, the components may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 610 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 610 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like. In at least one embodiment, the genAI models include one or more language models used to process prompts or other model inputs derived from sampled data and/or metadata to generate classifications and context labels, as described herein.

In embodiments that utilize language models (LMs) or otherwise perform operations that may require or be enhanced through the use of parallel processing, the processing circuitry 610 may include processors such as CPUs, GPUs, TPUs, or other specialized accelerators capable of supporting large-scale inference and training. The hardware resources may be deployed on-premises, in a cloud-computing environment, or in a hybrid configuration, and may include memory, storage, and networking components sufficient to support parallel execution, load balancing, and scalable processing of genAI workloads.

The memory 620 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 630.

In another embodiment, the memory 620 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, solid-state storage, or other non-transitory computer-readable storage media, and may be realized, for example, as flash memory or other memory technology, CD-ROM, Digital Versatile Disks (DVDs), hard disk drives, solid state drives (SSDs), or any other medium that may be used to store information. Storage 630 may include instructions (i.e., code) for executing the operations described herein, including, without limitation, detecting data objects in one or more cloud computing environments, obtaining and normalizing metadata associated with the data objects without accessing payload content, selectively obtaining one or more samples of data via optional content scanning or data sampling when permitted, generating sensitive-data classifications using pattern recognition, generating contexts and context labels for data findings based on sampled data and auxiliary mapping sources, storing context labels with representations of data findings in a security database, and initiating cybersecurity monitoring actions based on data findings and associated context labels. Storage 630 may further store configuration data, policy mappings, domain allowlists, BIN/IIN mapping tables, regulatory mapping data, context label definitions, findings (including timestamps and status), and/or intermediate and/or output data generated by DSPM system 110.

The network interface 640 allows the DSPM system 110 to communicate over one or more networks, such as the Internet or a local area network (LAN). The network interface 640 communicates with these elements. The network interface 640 may further support communication with one or more data sources and cloud services in a customer computing environment (e.g., computing environment 125 [FIG. 1]) including, for example, object storage services (e.g., bucket 130 [FIG. 1]), databases (e.g., database 140 [FIG. 1]), compute resources (e.g., compute resource 135 [FIG. 1]), storage disks (e.g., storage disk 145 [FIG. 1]), inventory and catalog services, event notification services, and other provider APIs by which metadata may be obtained without obtaining payload content. The network interface 640 may further support communication with an inspection environment (e.g., inspection environment 105 [FIG. 1]), including security database 120 (FIG. 1), and may support communication with monitoring system 160 (FIG. 1) and other external services, cloud-based platforms, and network-accessible APIs used for optional content scanning or data sampling when permitted and/or for initiating cybersecurity monitoring actions. In at least one embodiment, the network interface 640 supports wired and/or wireless communication protocols, including, without limitation, Ethernet, Wi-Fi, cellular, TCP/IP, HTTP/HTTPS, WebSocket, gRPC, and/or other suitable communication protocols, and may facilitate secure communication using authentication, encryption, and/or authorization mechanisms.

It should be understood that the embodiments described herein are not limited to the specific architecture illustrated in FIG. 6 and that other architectures may be equally used without departing from the scope of the disclosed embodiments.

It should be further noted that the DSPM system 110 may be realized using a computing architecture similar to the architecture illustrated in FIG. 6, but that other architectures may be equally used without departing from the scope of the disclosed embodiments. Further, the memory 620 may include instructions for executing the function of the respective device.

The various embodiments disclosed herein can be implemented as hardware, firmware, firmware executing on hardware, software, software executing on hardware, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as “first,” “second,” and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form “at least one of A, B, or C” or “one or more of A, B, or C” or “at least one of the groups consisting of A, B, and C” or “at least one of A, B, and C” used in the description or the claims means “A or B or C or any combination of these elements.” For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating and utilizing context labels for allocating cybersecurity monitoring resources in a cloud computing environment, comprising:

detecting a plurality of data objects in one or more data sources of the cloud computing environment;

generating a data finding based on data detected in the cloud computing environment, wherein the generated data finding is associated with at least one data object of the detected plurality of data objects;

obtaining metadata associated with the at least one data object via one or more provider interfaces that provide object properties without accessing payload content of the at least one data object;

obtaining, selectively, one or more samples of data from the at least one data object via at least one of an optional content scan and a data sampling operation when permitted;

generating a sensitive-data classification for the generated data finding by applying pattern recognition to at least a first sample of the obtained one or more samples of data;

generating a context for the generated data finding based on at least one of a second sample of the obtained one or more samples of data and the obtained metadata;

generating one or more context labels based on the generated context;

storing, in a security database, the generated one or more context labels with a representation of the generated data finding; and initiating a cybersecurity monitoring action in the cloud computing environment based on the generated data finding and at least one of the generated one or more context labels.

2. The method of claim 1, wherein storing the generated one or more context labels comprises storing at least a first context label at a finding level and storing at least a second context label at an object level for the at least one data object.

3. The method of claim 1, wherein the second sample is identical to the first sample.

4. The method of claim 1, further comprising:

generating a regulatory-related context label by applying a policy or regulatory mapping to at least one contextual attribute, wherein the cybersecurity monitoring action is initiated based on the generated regulatory-related context label.

5. The method of claim 1, further comprising:

selecting, by a gating controller, a candidate subset of data objects for at least one of the optional content scan and data sampling operation based on at least one of a policy constraint, a permission signal, the obtained metadata, and a risk indicator, wherein the one or more samples of data are obtained only from the candidate subset.

6. The method of claim 1, further comprising:

receiving feedback indicative of a false positive associated with at least one of the generated sensitive-data classification or the generated one or more context labels; and updating at least one of customer-configured rules, overrides, allowlists, blocklists, and exceptions used to generate the context or the one or more context labels based on the received feedback.

7. The method of claim 1, wherein generating the context further comprises:

determining whether an email address detected by the pattern recognition belongs to an internal employee domain or an external domain based on comparison to an employee domain store or directory; and generating a context label indicating internal or external.

8. The method of claim 1, wherein generating the context further comprises:

determining a payment card brand associated with a payment card number detected by the pattern recognition; and generating a context label indicating the payment card brand.

9. The method of claim 8, wherein determining the payment card brand further comprises:

determining an issuing country or region based on a BIN/IIN mapping; and generating a context label indicating the issuing country or region.

10. A system for generating and utilizing context labels for allocating cybersecurity monitoring resources in a cloud computing environment comprising:

a processing circuitry; and a memory, the memory containing instructions that, when executed by the processing circuitry, configure the system to:

detect a plurality of data objects in one or more data sources of the cloud computing environment;

generate a data finding based on data detected in the cloud computing environment, wherein the generated data finding is associated with at least one data object of the detected plurality of data objects;

obtain metadata associated with the at least one data object via one or more provider interfaces that provide object properties without accessing payload content of the at least one data object;

obtain, selectively, one or more samples of data from the at least one data object via at least one of an optional content scan and a data sampling operation when permitted;

generate a sensitive-data classification for the generated data finding by applying pattern recognition to at least a first sample of the obtained one or more samples of data;

generate a context for the generated data finding based on at least one of a second sample of the obtained one or more samples of data and the obtained metadata;

generate one or more context labels based on the generated context;

store, in a security database, the generated one or more context labels with a representation of the generated data finding; and initiate a cybersecurity monitoring action in the cloud computing environment based on the generated data finding and at least one of the generated one or more context labels.

11. The system of claim 10, wherein the memory containing further instructions which when executed by the processing circuitry when storing the generated one or more context labels further configure the system to:

store at least a first context label at a finding level and storing at least a second context label at an object level for the at least one data object.

12. The system of claim 10, wherein the second sample is identical to the first sample.

13. The system of claim 10, wherein the memory containing further instructions which when executed by the processing circuitry further configure the system to:

generate a regulatory-related context label by applying a policy or regulatory mapping to at least one contextual attribute, wherein the cybersecurity monitoring action is initiated based on the generated regulatory-related context label.

14. The system of claim 10, wherein the memory containing further instructions which when executed by the processing circuitry further configure the system to:

select, by a gating controller, a candidate subset of data objects for at least one of the optional content scan and data sampling operation based on at least one of a policy constraint, a permission signal, the obtained metadata, and a risk indicator, wherein the one or more samples of data are obtained only from the candidate subset.

15. The system of claim 10, wherein the memory containing further instructions which when executed by the processing circuitry further configure the system to:

receive feedback indicative of a false positive associated with at least one of the generated sensitive-data classification or the generated one or more context labels; and update at least one of customer-configured rules, overrides, allowlists, blocklists, and exceptions used to generate the context or the one or more context labels based on the received feedback.

16. The system of claim 10, wherein the memory containing further instructions which when executed by the processing circuitry when generating the context further configure the system to:

determine whether an email address detected by the pattern recognition belongs to an internal employee domain or an external domain based on comparison to an employee domain store or directory; and generate a context label indicating internal or external.

17. The system of claim 10, wherein the memory containing further instructions which when executed by the processing circuitry when generating the context further configure the system to:

determine a payment card brand associated with a payment card number detected by the pattern recognition; and generate a context label indicating the payment card brand.

18. The system of claim 17, wherein the memory contains further instructions which when executed by the processing circuitry when determining the payment card brand, are configure the system to:

determine an issuing country or region based on a BIN/IIN mapping; and generate a context label indicating the issuing country or region.

19. A non-transitory computer-readable medium storing a set of instructions for generating and utilizing context labels for allocating cybersecurity monitoring resources in a cloud computing environment, the set of instructions comprising:

one or more instructions that, when executed by one or more processing circuitries of a device, cause the device to:

detect a plurality of data objects in one or more data sources of the cloud computing environment;

generate a data finding based on data detected in the cloud computing environment, wherein the generated data finding is associated with at least one data object of the detected plurality of data objects;

obtain metadata associated with the at least one data object via one or more provider interfaces that provide object properties without accessing payload content of the at least one data object;

obtain, selectively, one or more samples of data from the at least one data object via at least one of an optional content scan and a data sampling operation when permitted;

generate a sensitive-data classification for the generated data finding by applying pattern recognition to at least a first sample of the obtained one or more samples of data;

generate a context for the generated data finding based on at least one of a second sample of the obtained one or more samples of data and the obtained metadata;

generate one or more context labels based on the generated context;

store, in a security database, the generated one or more context labels with a representation of the generated data finding; and initiate a cybersecurity monitoring action in the cloud computing environment based on the generated data finding and at least one of the generated one or more context labels.

* * * * *